Jan. 20, 1959

H. S. BROWN ET AL 2,869,982

RECOVERY OF PU VALUES BY FLUORINATION
AND FRACTIONATION

Filed April 12, 1945

INVENTORS
Harrison S. Brown
Donald S. Webster
BY
Robert A. Lavender

United States Patent Office 2,869,982
Patented Jan. 20, 1959

2,869,982

RECOVERY OF Pu VALUES BY FLUORINATION AND FRACTIONATION

Harrison S. Brown, Oak Ridge, Tenn., and Donald S. Webster, Richland, Wash., assignors to the United States of America as represented by the United States Atomic Energy Commission Application April 12, 1945, Serial No. 588,059

3 Claims. (Cl. 23—14.5)

This invention relates to a method involving the use of fluorination and fractionation for the concentration and recovery of Pu or associate elements. More particularly, this invention concerns a separatory and concentration process for isolating plutonium from uranium, fission products and the like extraneous matter by a combination of steps involving direct fluorination and fractionation adapted to the sizeable scale processing of neutron irradiated uranium materials.

As disclosed at other places, as for example in the pending applications to be referred to hereinafter, plutonium or element 94 is a relatively recently produced and studied material.

As described herein, the isotope of element 94 having a mass of 239 is referred to as $94^{239}$ and is also called plutonium, symbol Pu. In addition, the isotope of element 93 having a mass of 239 is referred to as $93^{239}$. Reference herein to any of these elements is to be understood as denoting the element generically, whether in its free state or in the form of a compound or concentrate, unless indicated otherwise by the context.

Elements 93 and 94 may be obtained from uranium by various processes which do not form a part of the present invention including irradiation of uranium with neutrons. Neutron irradiated uranium may be prepared by reacting uranium with neutrons from any suitable neutron source, but preferably the neutrons used are obtained from a chain reaction of neutrons with uranium.

Naturally occurring uranium contains a major portion of $_{92}U^{238}$, a minor portion of $_{92}U^{235}$, and small amounts of other substances such as $UX_1$ and $UX_2$. When a mass of such uranium is subjected to neutron irradiation, particularly with neutrons of resonance or thermal energies, $_{92}U^{238}$ by capture of a neutron becomes $_{92}U^{239}$ which has a half life of about 23 minutes and by beta decay becomes $93^{239}$. The $93^{239}$ has a half life of about 2.3 days and by beta decay becomes $94^{239}$. Thus, neutron irradiated uranium contains both $93^{239}$ and $94^{239}$ but by storing such irradiated uranium for a suitable period of time, the $93^{239}$ is converted almost entirely to $94^{239}$.

In addition to the above-mentioned reaction, the reaction of neutrons with fissionable nuclei such as the neucleus of $U^{235}$ results in the production of a large number of radioactive fission products. As it is undersirable to produce a large concentration of these fission products which must, in view of their high radio-activity, be separated from the $94^{239}$ and further as the weight of radioactive fission products present in neutron irradiated uranium is proportional to the amounts of $93^{239}$ formed therein, it is preferable to discontinue the irradiation of the uranium by neutrons when the combined amout of $93^{239}$ and $94^{239}$ is equal to approximately 0.02 percent by weight of the uranium mass. At this concentration of these substances, the concentration of fission elements which must be removed is approximately the same percentage.

As described above, Pu is obtained in relatively small amounts in the presence of U and extraneous matter such as fission products and the like. A number of processes have been proposed for accomplishing the separation and recovery of Pu, derivatives or compounds thereof or a concentrate containing the element or compounds of Pu. Some of the processes which have been proposed involve fluorination treatments that in many instances have also included hydrogenation or other steps. For example, hydrogenation causes the formation of uranium hydride then hydrogen fluoride is supplied to the reaction and finally the fluorination applied. Many of the prior processes have involved two or three operations such as hydrogenation, hydrogen fluoride treatment and the like as indicated. Other processes have involved the treatment of carrier precipitates or comparable materials by means of several operations including hydrogenation, hydrogen fluoride treatment and fluorination.

For example, one of such processes involving the use of fluorination in the treatment and separation of Pu is described in copending application Ser. No. 474,063, now U. S. Letters Patent No. 2,833,617, issued May 6, 1958, in which Harrison S. Brown, one of the herein-named inventors is a joint inventor with Glenn T. Seaborg. While the present invention resembles in some general respects certain of the features of the type processes aforementioned, the present invention constitutes different and improved procedure. That is, as the description proceeds it will be noted that the present invention involves a substantially direct fluorination adaptable to large scale treatment of material to recover plutonium therefrom.

Because of the admixture of the plutonium with a large amount of extraneous material, such as fission products or the like radio-activity some of which tends to follow the plutonium through processing, it is apparent that the separation or concentration of the plutonium presents a considerable problem. We have found, however, that in accordance with the present invention neutron irradiated U containing Pu and contaminated by fission products and other extraneous matter after processing by standard procedure for removing slug jackets or the like may then be treated by direct fluorination followed by fractionation to concentrate the Pu product as described in detail hereinafter.

The meaning of the terms fluorination, extraneous material, radioactivity, product, fractionation, and various other terms will be further apparent as the description proceeds.

This invention has for one object to provide a method for the separation and recovery of plutonium.

Another object is to provide a Pu recovery method involving the use of certain fluorination and fractionation steps.

Still another object is to provide procedures for separating plutonium as a fluoride from extraneous material.

A still further object is to provide a substantially single step fluorination method for directly treating irradiated slug material containing plutonium.

Another object is to provide a method for fractionating fluorination products of the class described.

Still another object is to provide a method of dry fluorination adaptable to large scale operation which requires less equipment than do wet processes and otherwise possesses advantages.

Another object is to provide suitable apparatus for carrying out the aforementioned methods.

Other objects will appear hereinafter.

For more complete understanding of the invention, reference will be made to the attached drawings.

Fig. 1 constitutes a semi-diagrammatic side elevation view somewhat in the nature of a flow sheet for illustrating one apparatus arrangement which may be employed for carrying out the process of the present invention.

Figure 1:
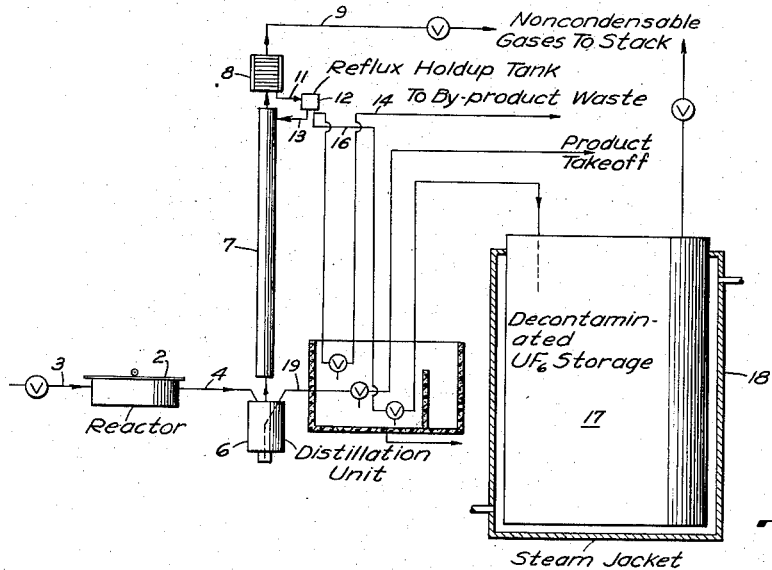
Figure 3:
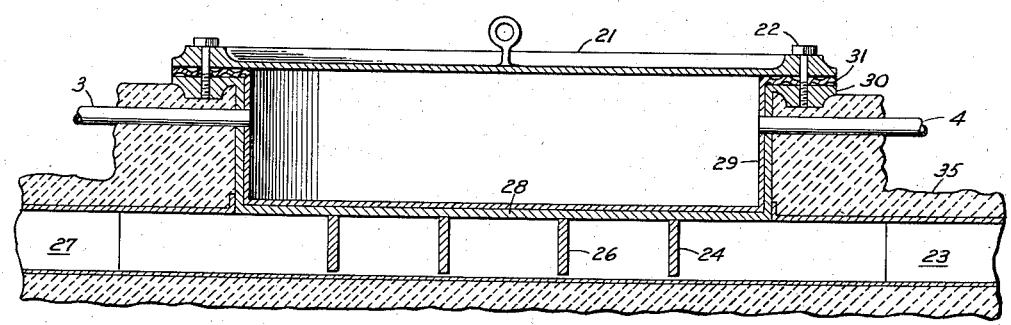
Fig. 3 is a sectional view of this reactor taken on the line A—A on Fig. 2.
Figure 2:
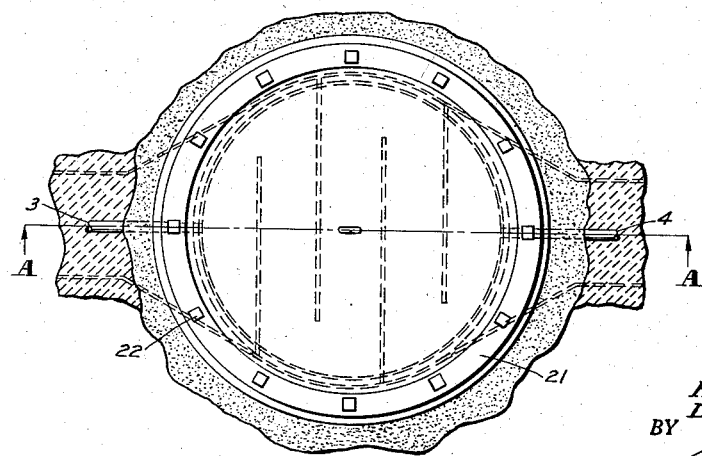
Fig. 2 is a top view on a considerable larger scale of the reactor indicated in Fig. 1.

In Fig. 1, the reactor 2 is provided for carrying out the single step of fluorination, the details of the reactor construction being better shown in Figs. 2 and 3. The conduit 3 is an inlet for fluorine being supplied to the reactor. Conduit 4 is an exhaust or outlet conduit for the reaction products and the like produced in the reactor. This conduit discharges into the boiler or base heater 6. A rectification means 7, such as a column packed with rings or a plate column is positioned above the base heater for fractionating fluorination products. Column 7 is connected through condenser means 8 to conduit means 9 for exhausting noncondensables to waste or other disposal. Conduit 11, also leading from the condenser is connected to a reflux hold up tank, weir box or similar device 12 from which part of the condensate may be diverted back to column 7 by means of conduit 13, or withdrawn through conduits 14 and 16. For example, conduit 16 may lead to a jacketed storage container 17, the jacketing being indicated at 18. Another conduit, indicated at 19, leads into the base heater for providing a product takeoff.

Referring to Fig. 2, there is provided a removable head 21 which may be held in place, in a gas tight manner, by the bolts 22. The various parts of the reactor which come in contact with fluorine are constructed from fluorine-resistant material such as Monel metal, Ni, Cu, inhibited steel or other fluorine resistant materials which may be made available. The parts 3 and 4 are the inlet and outlet conduits already referred to.

The other parts of the reactor are better shown in Fig. 3. Associated with the reactor as at 23 is provided an inlet conduit for heating medium utilized for raising the reactor to a suitable temperature for initiating reaction. The heating conduit would contain several alternate baffles exemplified by parts 24 and 26 for better distributing the heating medium in contact with the bottom of the reactor. The heating medium may be exhaused through conduit 27. As indicated the reactor comprises any suitable type of chamber lined or otherwise constructed of fluorine resistant material, as for example Monel metal, indicated at 29. This material may be caused to extend over the edge 30 of the reactor and corrugations provided as shown at 31 for giving a gas-tight chamber when the head is bolted in place. Suitable heat insulation medium as rock wool, refractory cement or the like may be provided at 35.

For general understanding of our process, as well as the understanding of the operation of the apparatus which has been described above, an overall description thereof will now be given. Since the present invention is applicable to large scale operation, description will be directed to the treatment of irradiated slugs. That is, uranium materials which are irradiated by neutrons as described in the first part of the present application are frequently contained in a casing such as an aluminum jacket. Therefore, prior to the application of our process, there may be certain preliminary operations such as removing the casings from the slugs which would be carried out prior to introducing the neutron irradiated material into the reactor of the present invention. Presumably also the neutron irradiated material would have been suitably stored for a period prior to the jacket removal. In other words, prior to the application of our invention any conventional steps for placing the neutron irradiated material in condition for better handling and processing may be applied; hence the foregoing features are only briefly mentioned. The exact method of irradiating the material or otherwise processing it to provide a material containing plutonium is not a limitation on the present invention and constitutes the work of others. For the purposes of describing this invention it will merely be indicated that a suitable source of neutron irradiated material which has been stored, dejacketed, or otherwise treated, is made available for processing by the present invention.

That is, in further detail, irradiated jacketed slugs are brought to the extraction plant of the present invention in a sieved basket holding, for example, one thousand pounds of metal, via a tank car, in a manner similar to the handling of material in existing processes. The basket would then be transferred to a shielded dissolver cell and lowered into the dissolver for a time sufficient to dissolve the aforementioned jackets, after which it would be removed and allowed to drain. When dry, the basket would be hoisted up and over into another cell, and the contents discharged into a dry fluoride reactor as described under Figs. 2 and 3.

As indicated, this reactor may be of metal, several feet in diameter and a foot or more deep, with a removable lining of $\frac{1}{16}''$ Monel sheet. The bottom of the reactor forms the top of a baffled heat exchange chamber as described, which would heat or cool the reactor as required by means of air or other heating medium from a 1000 C. F. M. blower-furnace system located outside the cell but connected with conduit 23. The lid 21 is removable, to allow easy disposal of the Monel lining when contaminated beyond further use, and sealed with a gasket and bolt assembly adapted to manipulation by remote control devices so that operators do not have to be near the device when radioactive materials are present.

As soon as the reactor is charged with metal, the lid may be fastened on, fluorine admitted at about 40 p. s. i. and the reactor heated to the reaction temperature as for example about 250° C. After the reaction is under way the system is maintained at a temperature over 300° C., to prevent deposition of plutonium fluoride. The resulting $UF_6$ vapor, sweeping fluorides of plutonium and the volatile fission products with it, pass from the reactor of the apparatus through a heated pipe 4, where they are condensed and collected in the fractionation unit with a boiler 6 (see Fig. 1).

After the fluorination reaction is complete, the fractionation system may be run at total reflux until the concentration of low-boiling fission products, such as Mo plus Te and the like, in the top of column 7 reaches a constant value. That is, the mixture of fluorination products containing uranium hexafluoride, plutonium fluoride, and the low boiling and other components in base heater 6 are heated to a sufficient temperature, dependent on the internal pressure in the column, to cause volatilization of at least the low boilers. These vapors ascend in the column to condenser 8 which is run at a sufficiently low temperature to condense low boiling fission products such as Mo and Te aforementioned. Gaseous components not condensable in the condenser pass out of the apparatus to a disposal stack. The condensate may be collected in 12, and for a period, all thereof run back through conduit 13 to the column as reflux. After the process has been in operation for a period, returning only a part of the condensate as reflux is adequate to give satisfactory fractionation. There is a sufficient temperature increment between the boiling of components such as Mo and Te so that separation may be accomplished relatively easily. Of the two, Mo and Te, the latter requires less reflux for satisfactory fractionation than the former. Hence, condensate may be run to by-product storage through conduit 14 until this accumulation had been removed. This cycle of total reflux and condensate run-off may be repeated until the charge is sufficiently free of low boiling components. This procedure eliminates the equipment and operating precision otherwise needed to maintain the very high reflux ratio required for removal of these chemical components.

Thereafter the heat supply may be increased somewhat so that a large amount of $UF_6$ volatilizes. $UF_6$ condensate then collects in box 12 and would be drawn continuously from the reflux holdup tank or weir box 12 and dropped through conduit 16 to storage, with the column operating at a fairly low reflux ratio during this period. That is, of the $UF_6$ condensate collected in 12 only a part thereof need be returned through conduit 13 for reflux, the remainder being withdrawable from the system. The bottoms remaining in 6 contain Pu and high boiling fission products dissolved in, for example, a gallon or so of $UF_6$ on the basis of an original charge in 6 of about fifty gallons. This concentrated material may be blown out conduit 19 or otherwise removed to another cell where any further decontamination and concentration desired may be applied.

That is, after the foregoing major extraction is performed, finishing decontamination and concentration can be applied such as the known dry oxidation-reduction cycles, or by wet cycles. The exact manner of further cleaning up the product and converting it to derivatives for any desired use is not a limitation on the present invention. There are a number of suitable methods described in copending applications exemplified by U. S. patent application Ser. Nos. 519,714, (now U. S. Patent No. 2,785,951, issued March 19, 1957), 552,546 and 552,547.

There are several points about the described process which may be amplified—for example, the source of $F_2$ may be 25 or 30 units located near the cell housing reactor 2. Such items may be obtained commercially from various chemical manufacturers, who have experience in pressure handling of $F_2$.

It is to be noted that it is not absolutely necessary to use the $F_2$ under pressure, but by so doing this allows the $UF_6$ to condense as a liquid at 100° C. rather than as a solid, which is of some advantage.

As already described, all equipment in contact with $F_2$ and $UF_6$ will preferably be of Monel. In the construction of the present invention corrodible items have been kept to a minimum. That is, the few valves required may be located in a cell next to the fractionation unit 7, where they can be worked on if necessary. If a leak should appear in any valve, the $F_2$ may be cut off and the system brought down to atmospheric pressure by cooling. All lines should then drain free of liquid, for more convenient servicing of the valves.

During fractionation the reactor 2, would be kept hot so that no liquid would be present in it. The heating and cooling air may be discharged to waste through a high stack.

In general it would be preferred to operate two or more of these units for handling a ton of metal per day rather than a single larger unit. The $UF_6$ waste may be stored in underground steel or concrete tanks.

For a more detailed understanding of the invention, the following illustrative example is set forth.

Cover 21 is removed and several hundred pounds of hot slugs from which the jackets have been dissolved are placed within the reactor, and the cover bolted in place in a gas tight manner. In order to initiate reaction, these slugs are heated to between 250° C.-350° C. by introducing hot combustion products into conduit 23 (Fig. 3). This may be accomplished by burning a combustible mixture and blowing the products of combustion in at 23. Later in the process, in order to cool, this is accomplished by stopping the burning of fuel and merely blowing air through. Fluorine is then introduced into the reaction chamber, preferably under pressure of from 40 to 100 lbs. per sq. in., through conduit 3. After the reaction has been initiated, it is exothermic and heating or cooling medium is introduced through conduit 23 as is required for maintaining the temperature between 300° C.-500° C.

The fluorine reacts with the slugs in the reactor and vapors comprising fluorination products of U, Pu, and fission products flow through conduit 4 into the base heater 6. By suitably insulating or applying positive heating to conduit 4 condensation therewithin is prevented. After the reaction is completed, heat is applied to base heater 6 in accordance with standard fractionation procedure, for distilling off low boiling fission products. This distillation step is accompanied by refluxing through conduit 13 and other technique usually employed in distillation. These by-products distilled off may be diverted through conduit 14 to suitable disposal.

After the low boiling components have been removed, the fluorination products of uranium may be volatilized off, the distillation being carried out with suitable reflux returned through conduit 13, and the $UF_6$ withdrawn through conduit 16 to storage tank 17.

After the preceding steps have been carried out, the residue remaining in base heater 6, comprising fluorination products of U having the desired fluorination product of Pu therein, are blown or syphoned through conduit 19 to further purification and concentration treatment as by standard wet or dry processes referred to above. In connection with the amount of residue in 6 and the concentration of Pu effected, for example, one gallon of $UF_6$ remaining in the base heater would contain, perhaps, Pu products to the order of about 125 grams from the several hundred pound lot aforementioned. The exact amount of Pu recovered or concentrated, will of course depend on the quantity present in the initial charge. However, with charges containing either large or small amounts of Pu a yield of at least 90% of the Pu in the initial charge may generally be isolated in a small volume of the $UF_6$ in base heater 6.

The control of the process may be conducted much the same as any process involving the treatment of radioactive material. That is, standard counters such as Geiger-Mueller counters may be associated with the apparatus for determining the quantity and type of radioactive material. For example, the product plutonium may be followed by means of its alpha count. A suitable sample of the initial charge can be taken and the alpha count made thereon. From this information the plutonium content of the entire charge can be determined. In similar manner by suitably counting a representative sample in the base heater 6, the quantity of plutonium recovered at this point may be determined. Likewise, the quantity and nature of the radioactivity separated through the various conduits 14 and 16 may be determined. In addition, standard temperature and pressure regulators or other devices used in the control of distillation equipment may also advantageously be used in association with the apparatus described herein.

Therefore, it is to be understood that the foregoing and other expedients may be applied to the process and apparatus of the present invention without limiting the scope thereof.

The process of the present invention possesses a number of advantages over fluorination processes heretofore used. For example, since the present process does not require the use of hydrogenation in conjunction with fluorination, the problems involved in handling hydrogen do not exist. Likewise the present process does not require the use of nitrogen for controlling the vapor movement or for obtaining nitrogen sweeps.

The present process also possesses advantages over prior art wet processes in that the instant process requires less equipment than many of the so-called wet processes. There are no moving parts such as agitators, centrifuges, and the like, in the present arrangement. The present process requires only one major chemical. The metal waste is small in volume, as for example, 100 gallons of uranium hexafluoride per ton of metal processed. This metal waste, free of activity, may be stored in a useful form from which the U may be recovered.

It is to be understood that all matters contained in the above description and examples are illustrative only and do not limit the scope of this invention.

We claim:

1. A process for reacting fluorine with a metallic mass comprising a mixture of uranium and plutonium which comprises heating said mass to a temperature of about 250° C. for a sufficient period to initiate reaction when contacted with fluorine, passing fluorine gas under pressure into contact with the heated mass, maintaining sufficient pressure so that uranium hexafluoride is in the liquid phase at a temperature of 100° C., continuing to apply said heating to an extent adequate for maintaining the reaction, withdrawing reaction products comprising the fluorination products of uranium and plutonium, subjecting these fluorination products to a distillation treatment for separating fluorination products of uranium, in order to obtain a residue containing fluorination products of plutonium, and conducting off this residue containing plutonium fluorination products.

2. The process which comprises heating a metallic mass comprising a mixture of uranium and plutonium to a temperature in excess of about 250° C. for a sufficient period to initiate reaction when contacted with fluorine, passing fluorine gas under pressure of 40 to 100 pounds per square inch into contact with the heated mass, continuing to apply said heating to an extent adequate for maintaining the reaction, withdrawing reaction products comprising the fluorination products of uranium and plutonium, and subjecting these reaction products to a distillation treatment for separating fluorination products of uranium, in order to obtain a residue containing fluorination products of plutonium.

3. The process for reacting fluorine with a metallic mass comprising essentially a mixture of uranium and plutonium which comprises heating said mass to a temperature in excess of about 250° C. for a sufficient period to initiate reaction when directly contacted with fluorine, passing fluorine gas under pressure into contact with the heated mass, continuing to apply said heating to an extent adequate for maintaining the reaction, withdrawing reaction products comprising the fluorination products of uranium and plutonium, and subjecting these reaction products to a fractionation treatment in order to obtain a residue containing fluorination products of plutonium.

References Cited in the file of this patent

UNITED STATES PATENTS

| | | |
|---|---|---|
| 1,093,749 | Weaver | Apr. 21, 1914 |
| 1,392,046 | Booth | Sept. 27, 1921 |
| 1,434,485 | D'Adrian | Nov. 7, 1922 |
| 1,434,486 | D'Adrian | Nov. 7, 1922 |
| 1,517,526 | Barnebey | Dec. 2, 1924 |
| 1,851,475 | Zimmermann | Mar. 29, 1932 |
| 1,869,019 | McIntyre | July 26, 1932 |
| 1,927,108 | Zimmerman | Sept. 19, 1933 |
| 1,937,885 | Gitzen et al. | Dec. 5, 1933 |
| 2,021,991 | Depew | Nov. 26, 1935 |
| 2,047,545 | Buttfield | July 14, 1936 |
| 2,160,177 | Sherman | May 30, 1939 |
| 2,387,228 | Arnold | Oct. 23, 1945 |
| 2,833,617 | Seaborg et al. | May 6, 1958 |

OTHER REFERENCES

Abegg's Handbuch der anorganischen Chemie, vol. 4, p. 931 (1921), Leipzig, Verlag von S. Hirzel.